(12) United States Patent
Jerez et al.

(10) Patent No.: US 10,440,881 B2
(45) Date of Patent: Oct. 15, 2019

(54) WEED TRIMMING APPARATUS, WEED TRIMMER HEAD, AND TRIMMER LINE RETENTION DEVICE

(71) Applicants: Orlando Jerez, Kenner, LA (US); Orlando Jerez, Jr., Kenner, LA (US)

(72) Inventors: Orlando Jerez, Kenner, LA (US); Orlando Jerez, Jr., Kenner, LA (US)

( * ) Notice: Subject to any disclaimer, the term of this patent is extended or adjusted under 35 U.S.C. 154(b) by 0 days.

(21) Appl. No.: 15/470,908

(22) Filed: Mar. 28, 2017

(65) Prior Publication Data
US 2017/0196165 A1    Jul. 13, 2017

Related U.S. Application Data

(62) Division of application No. 12/189,556, filed on Aug. 11, 2008, now Pat. No. 9,603,301.

(60) Provisional application No. 60/955,161, filed on Aug. 10, 2007.

(51) Int. Cl.
*A01D 34/416* (2006.01)
*A01D 34/68* (2006.01)

(52) U.S. Cl.
CPC ....... *A01D 34/4166* (2013.01); *A01D 34/416* (2013.01); *A01D 34/68* (2013.01)

(58) Field of Classification Search
CPC ... A01D 34/4166; A01D 34/416; A01D 34/68
See application file for complete search history.

(56) References Cited

U.S. PATENT DOCUMENTS

| | | | | |
|---|---|---|---|---|
| 5,758,424 A * | 6/1998 | Iacona | ........... | A01D 34/4166 30/276 |
| 6,519,857 B1 * | 2/2003 | Proulx | ........... | A01D 34/416 30/276 |
| 6,601,373 B1 * | 8/2003 | Legrand | ........... | A01D 34/4168 30/276 |
| 6,715,270 B1 * | 4/2004 | Yandle, II | ........... | A01D 34/4166 30/276 |
| 6,928,741 B2 * | 8/2005 | Proulx | ........... | A01D 34/4166 30/276 |
| 7,257,898 B2 * | 8/2007 | Iacona | ........... | A01D 34/416 30/276 |
| 7,587,828 B2 * | 9/2009 | Legrand | ........... | A01D 34/416 30/276 |

* cited by examiner

*Primary Examiner* — Omar Flores Sanchez
(74) *Attorney, Agent, or Firm* — Norton IP Law Firm; Taylor M. Norton

(57) ABSTRACT

A protective glider assembly for a handheld trimmer apparatus includes a glider plate operatively connected to a glider shaft. A bearing acts between the glider plate and glider shaft. The protective glider is configured to rotate or remain stationary independent of and relative to rotation of a rotary head of the handheld trimmer. The glider plate is positionable relative to the rotating head to adjust cutting height of trimmer members. A first series of trimmer members are connected to the head in a first plane which is generally parallel to a second series of trimmer members connected to the head in a second plane. The rotary head forms a trimmer member passage therethrough and includes a fastening mechanism having a pivotally moveable engaging member configured to clear the passage and to extend through a mount aperture of a trimmer member when positioned in the passage.

9 Claims, 5 Drawing Sheets

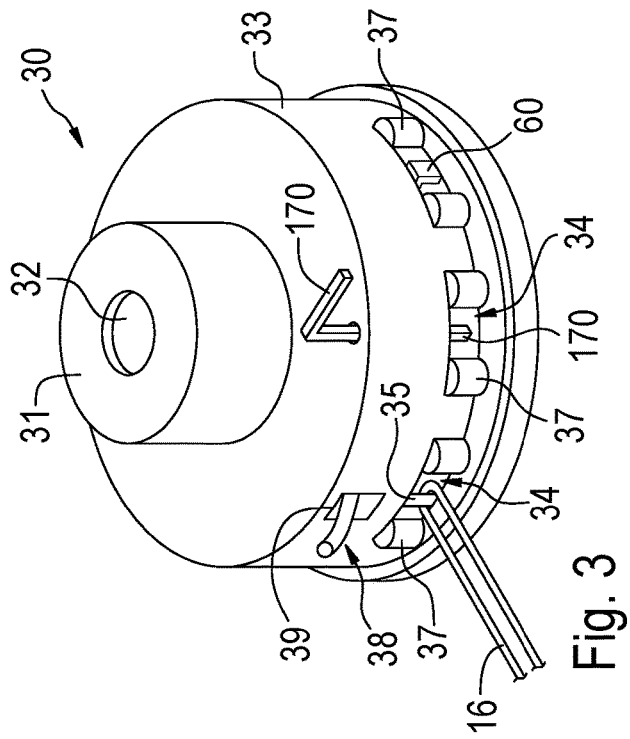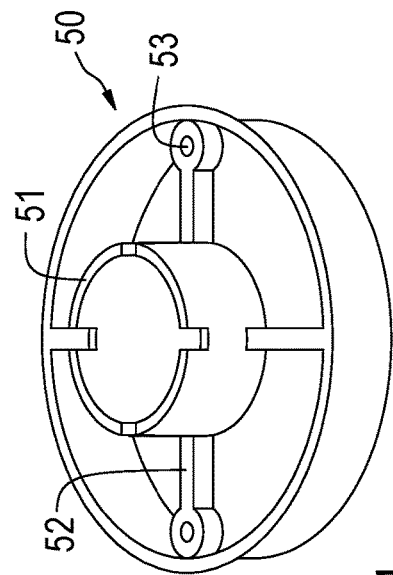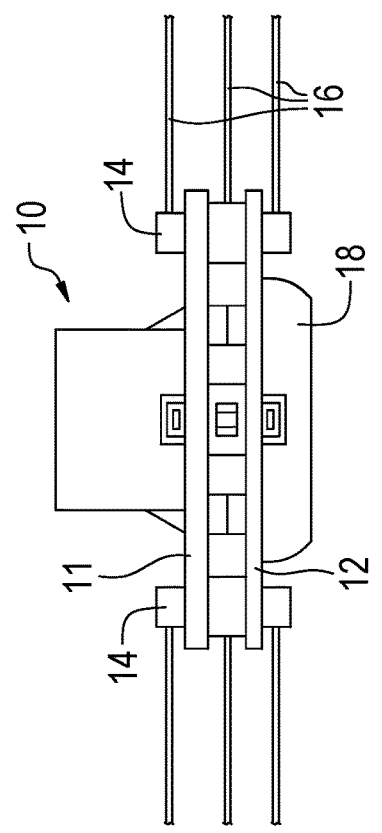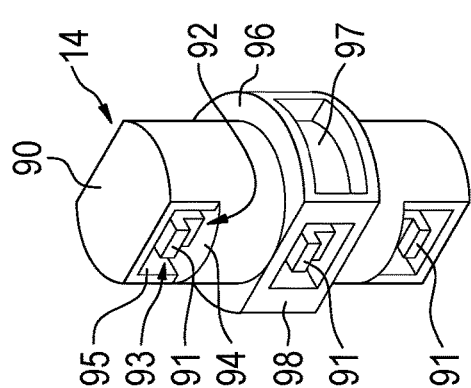

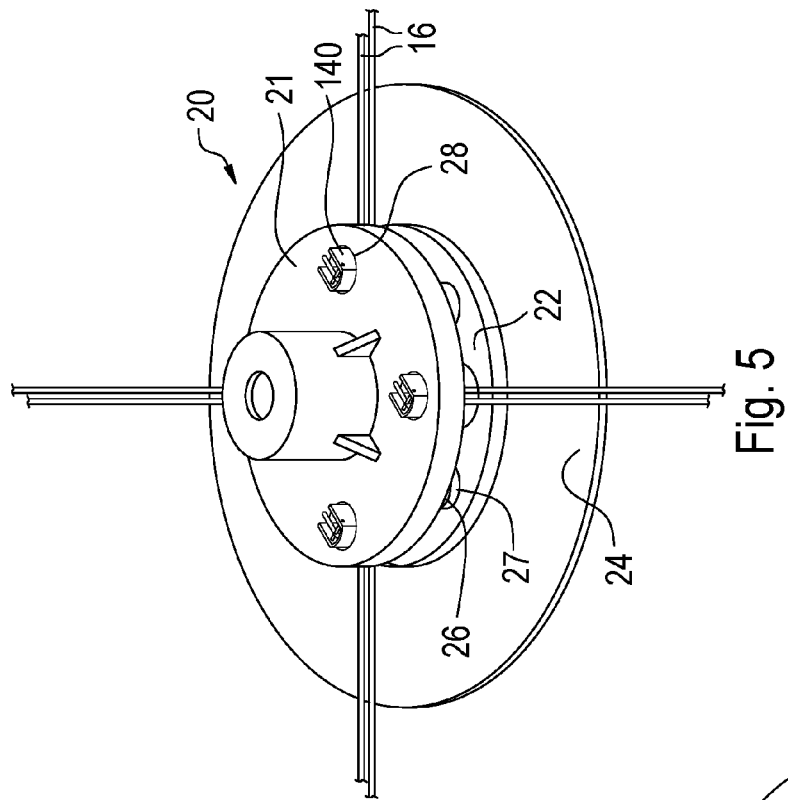
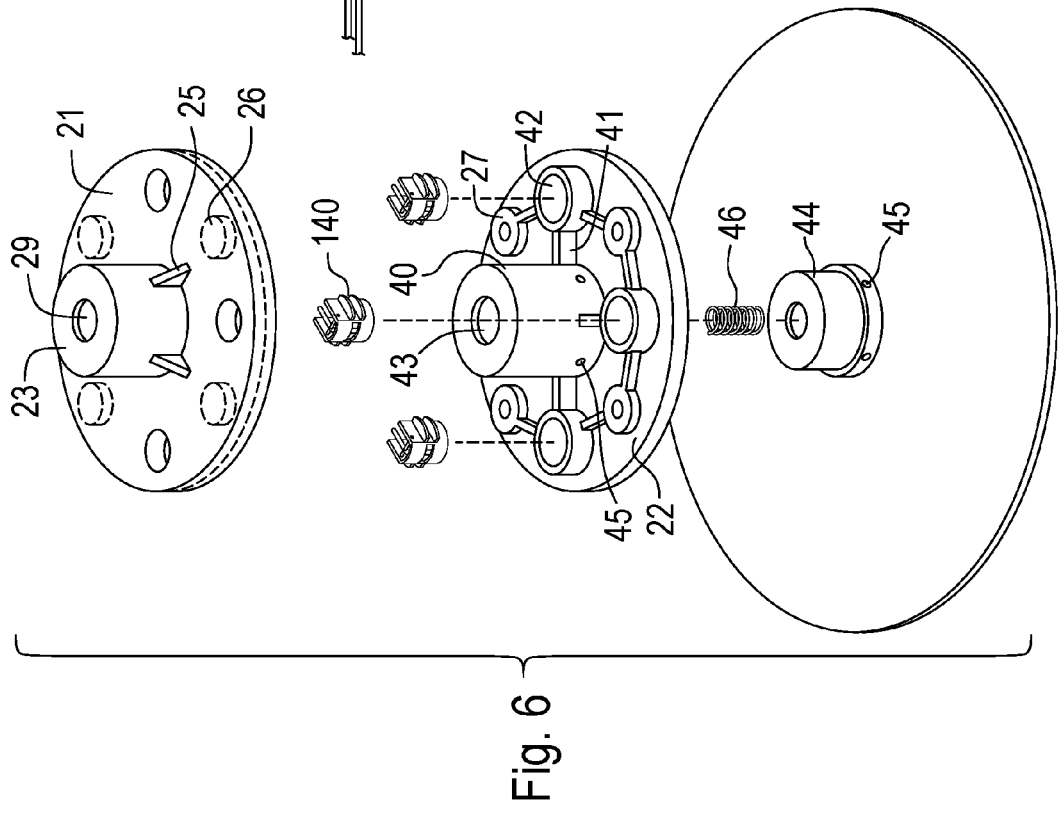

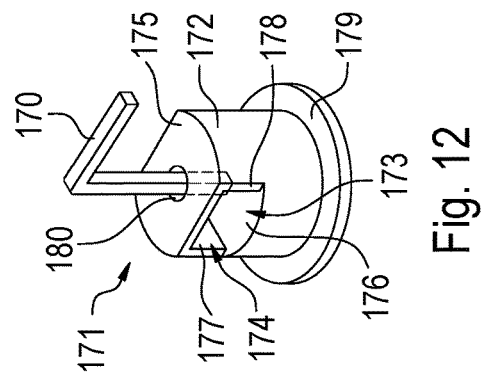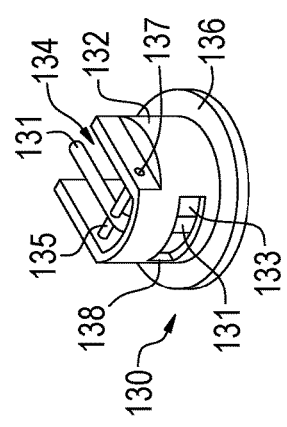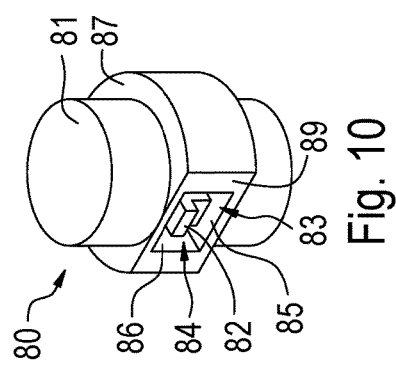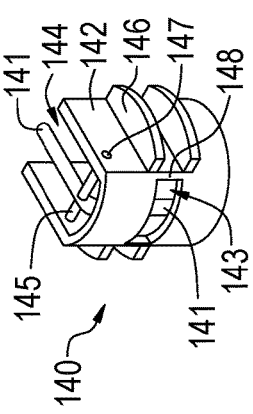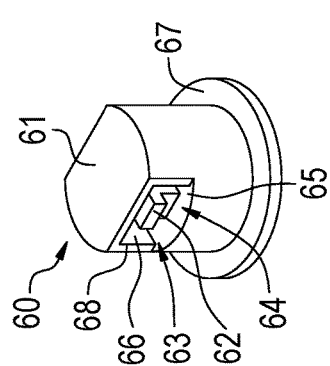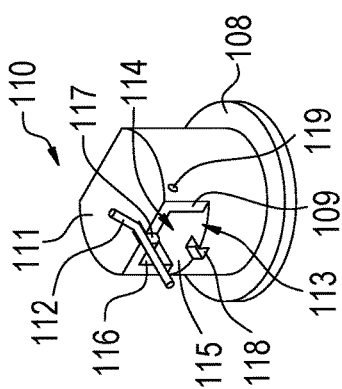

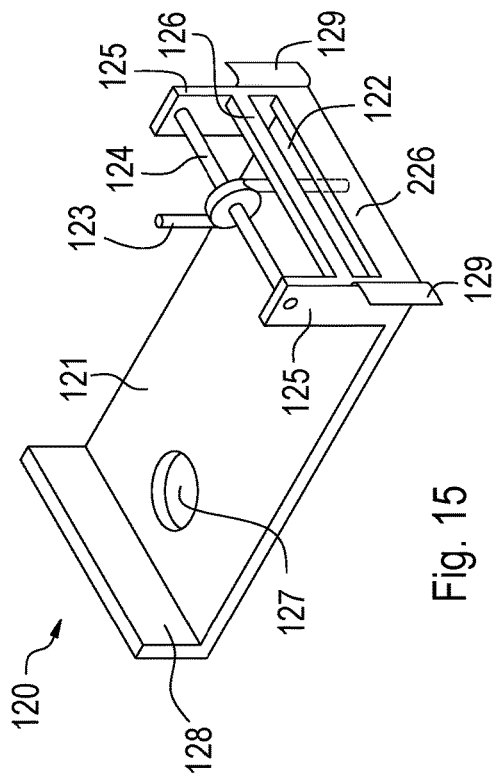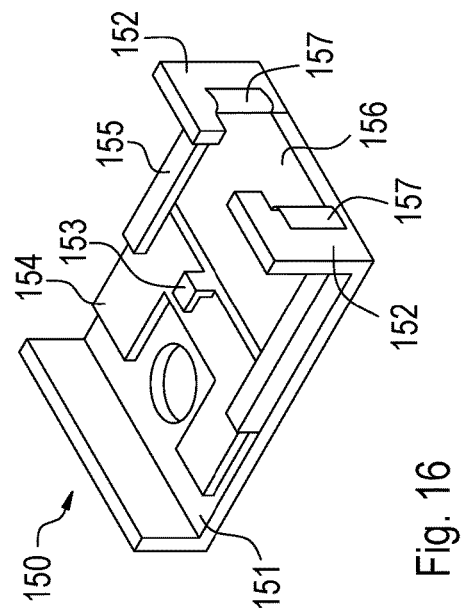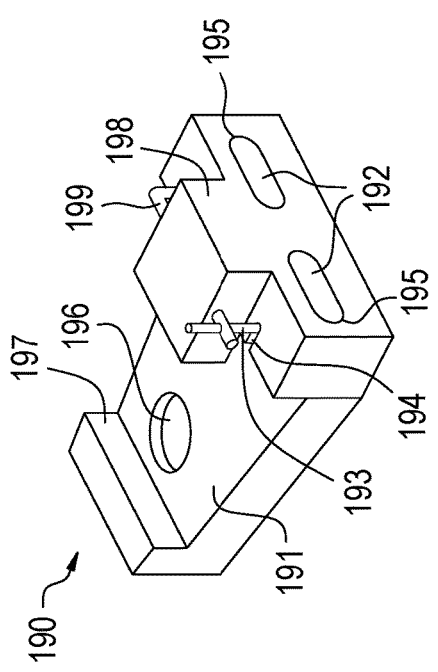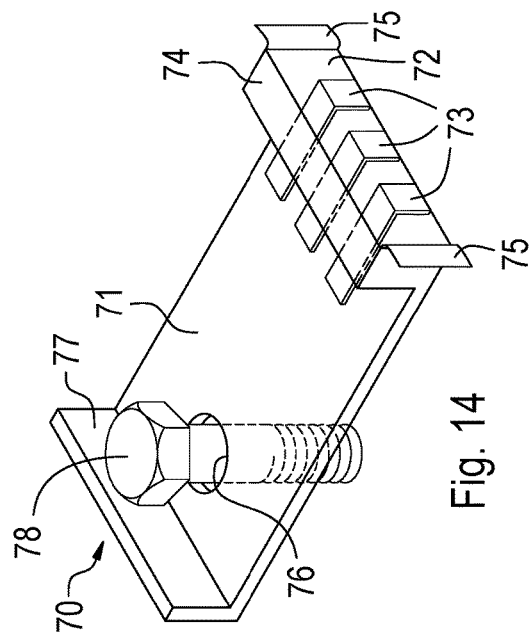
Fig. 13
Fig. 14
Fig. 15
Fig. 16

WEED TRIMMING APPARATUS, WEED TRIMMER HEAD, AND TRIMMER LINE RETENTION DEVICE

CROSS-REFERENCE TO RELATED APPLICATIONS

This application is a divisional continuation of co-pending and commonly owned U.S. application Ser. No. 12/189,556, filed on Aug. 11, 2008, which claims the benefit of priority of U.S. Provisional Application No. 60/955,161, filed Aug. 10, 2007, and the disclosure of each application identified above is hereby incorporated herein by reference in its entirety.

TECHNICAL FIELD

This invention relates to weed or grass trimmer apparatuses using a trimming head and trimmer line retention devices with a flexible trimmer line which is rotated at a relatively high speed during operation.

BACKGROUND

Presently, there are trimming apparatuses known in the art having a rotatable, attachable head for attachment to a powered device, with the head carrying a series of trimmer lines extending axially out about the periphery of the head. Examples of such weed trimming apparatuses include spool and "bump 'n' feed" weed trimming apparatuses with continuous-feed trimming line and trimming apparatuses using fixed-length pieces of trimming line. However, current weed trimming apparatuses have certain drawbacks which have gone largely unaddressed in this technical field. Some weed trimming apparatuses require extensive time to change trimmer line, while others may require tools to take apart the head of the trimming apparatus to change the trimmer line. Still others suffer from high rates of trimmer line breaking due to the fixed manner in which the retention device of the trimmer line operates.

Accordingly, there is still a great and long-felt need for a weed trimmer apparatus that provides quick and easy trimmer line insertion and security during operation as well as simple and efficient trimmer line removal when changing trimmer line. There is also a great and long-felt need for a weed trimmer apparatus which enjoys increased trimmer line durability and integrity while being simple to use and maintain.

SUMMARY OF THE INVENTION

The present invention addresses the foregoing needs in a highly unique and facile way. Thus, in one embodiment, the present invention provides a novel weed trimmer apparatus, particularly weed trimmer heads including rotating components from which trimmer line cutting members may extend. Particularly, in at least one of its aspects, this invention provides quick and easy trimmer member insertion and security during operation. In another aspect, the invention also facilitates removal of trimmer member during change out, so that there is no need to disassemble the head of the trimmer apparatus, as required in other known trimmer head apparatuses. Therefore, no tools are needed for trimmer member removal and replacement. Also, certain embodiments of the present invention allow for operation of the device in a fixed mode or, in alternative embodiments, an oscillatory mode, depending on the way the trimmer member is attached to the head.

In at least one embodiment, the present invention relates to a weed or grass trimming apparatus (hereinafter "weed trimmer apparatus") using a trimming head and at least one trimmer member retention device with a trimmer member which is rotated at a relatively high speed during operation. Certain embodiments of the present invention may be used with, for example, a hand-held, powered tool or a walk-behind device. The hand-held tool may be equipped with a very long handle or a more compact, hand-gun-like design or the like. Examples of a hand-held tool include, but are not limited to, the long-handled version of weed trimmers, such as a WEED EATER® device or the like. Alternatively, the weed trimmer apparatus may take the form of a wheeled-type, powered device in which the user walks behind the device. The weed trimmer heads may be attached to an electrically, gas, hand, or similarly powered device which causes the trimmer head to rotate at relatively high speeds. Furthermore, in a particular embodiment of the invention, a more flexible trimmer line, e.g. rope, may be retained by the trimmer line retention members and the weed trimmer apparatus may be used in a broom-like manner, where the draft of air generated by the rotation of the trimmer line and the trimmer line itself may displace objects (e.g., leaves, grass, etc.) from an area in which the weed trimming apparatus is being operated.

In one of its embodiments, the present invention provides a weed trimmer apparatus which comprises a head defining at least one side wall, the side wall forming one or more apertures therethrough, and one or more line retention members for retaining one or more trimmer members, the line retention members being operatively connected to the head, wherein each line retention member is sized and configured to extend through a loop or aperture of at least one trimmer member during operation of the weed trimmer apparatus and wherein each retention member is dynamically connected to the head to allow for installation and removal of the trimmer member. In a preferred embodiment, a weed trimmer apparatus is provided comprising a rotating head supporting trimmer members, a glider plate to guard against excessive wear of the trimmer members, a glider shaft coupleable at one end with the rotating head, and a bearing acting between the glider plate and the glider shaft. Preferably, the glider plate is configured to rotate or remain stationary independent of and relative to any rotation of the head. Preferably, the glider plate is substantially circular in shape and is connected to the a lower-most plate of the head. In a preferred embodiment, the glider plate is selectively positionable relative to the rotating head to adjust a cutting height of the trimmer members, by turning of the connecting bolt which acts against the bias of the spring and thus adjusts the position of the glider plate relative to the rotating head.

Another embodiment of the present invention is a weed trimmer apparatus comprising a head defining at least one side wall, the side wall forming one or more apertures therethrough, and one or more line retention members for retaining one or more trimmer lines, the line retention members being operatively connected to the head, wherein each line retention member is sized and configured in the form of a hook, wherein each hook extends through a loop of at least one trimmer line during operation of the weed trimmer apparatus. In a preferred embodiment, a trimmer head for a rotary cutting apparatus comprises a body portion, a trimmer member passage extending through the body portion from a trimmer member entrance opening to a trimmer member install position, and a trimmer member fastening mechanism having a trimmer member engaging member. In such preferred embodiment, that trimmer member engaging member is pivotally movable between a first position and a second position. The trimmer member engaging member is biased by a biasing mechanism into the second position such that the trimmer member engaging member extends across the trimmer member passage at the trimmer member install position, such that the engaging member is movable against such bias to clear such passage. Preferably, such embodiment further comprises a trimmer member forming a mount aperture proximate an insertion end of the trimmer member. Such trimmer member is secured to the body portion of the trimmer head when the mount aperture occupies the trimmer member install position and the trimmer member engaging member extends through said mount aperture. In such embodiment, the trimmer member is secured to the body portion by inserting the insertion end of the trimmer member into the trimmer member entrance opening and advancing the mount aperture through the trimmer member passage toward the trimmer member install position, such that the insertion end contacts the engaging member and moves the engaging member to the first position to clear the trimmer member passage. The trimmer member engaging member has a longitudinal axis, and when it is in the first position, the trimmer member engaging member is disposed in a recess in the trimmer body portion and the longitudinal axis is oriented substantially parallel to a longitudinal axis of the trimmer member.

Yet another embodiment of the present invention is a weed trimmer apparatus comprising a head comprising two or more plates, and one or more retention devices operatively connected to one or more of the plates, wherein the one or more plates are substantially parallel to one another, and wherein the one or more retention devices comprise one or more retention members for retaining one or more trimmer members, and wherein each retention member is sized and configured to extend through a loop or aperture of at least one trimmer member during operation of the weed trimmer apparatus.

Still yet, another embodiment of the present invention is a retention device comprising a case, and one or more retention members for retaining one or more trimmer members which retention member is operatively connected to the case, wherein through the case is formed a chamber with an aperture from the chamber on at least one side wall of the case, wherein the retention member for retaining at least one or more trimmer members extends through the aperture of the chamber.

One preferred embodiment of the present invention is a trimmer head comprising a substantially flat blade shaped member that forms an opening on one end, wherein the opening is sized and configured to receive a retention bolt or other connector device, preferably a pendulum, in order to use it in an oscillatory manner. Still another embodiment of the present invention is a retention device comprising a substantially flat blade shaped member which forms an aperture near one of its ends, and at least one line retention member which is operatively connected to the flat member at an end of the flat member distal to the aperture, wherein the line retention member is sized and configured to engage and to retain at least one loop of one or more trimmer lines.

These and other embodiments and features of this invention will be still further apparent from the ensuing description, accompanying figures and appended claims.

BRIEF DESCRIPTION OF THE DRAWINGS

FIG. 1 illustrates a head of a weed trimmer apparatus of one embodiment of the present invention.

FIG. 2 illustrates a retention device of one embodiment of the present invention.

FIG. 3 illustrates a head of a weed trimmer apparatus of another embodiment of the present invention.

FIG. 4 illustrates a trimmer head protective guard of one embodiment of the present invention.

FIG. 5 illustrates a head of a weed trimming apparatus of another embodiment of the present invention.

FIG. 6 illustrates an exploded view of FIG. 5.

FIGS. 7-16 each illustrate a retention device of another embodiment of the present invention.

Like reference numbers or letters are employed within the various figures to refer to like parts or components.

FURTHER DETAILED DESCRIPTION OF THE INVENTION

Figure 17:
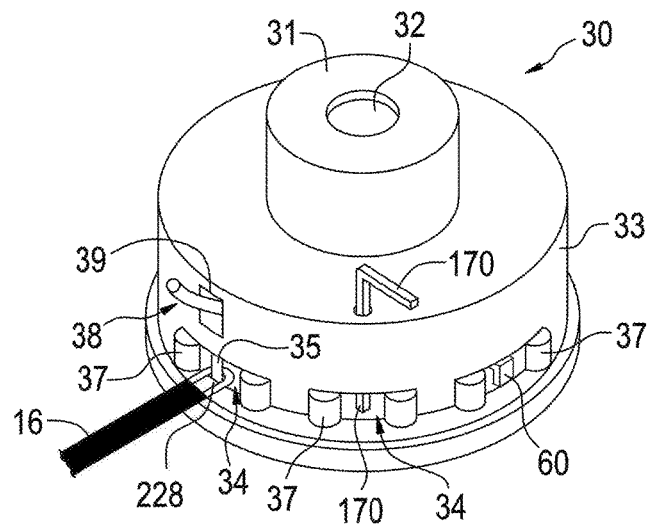
FIGS. 17-19 each illustrate a trimmer member forming a mount aperture.

FIG. 1 illustrates a trimmer head 10 of a weed trimmer apparatus consistent with one embodiment of the present invention, wherein the head 10 comprises two plates in this embodiment—an upper plate 11 and a lower plate 12, and one or more retention devices 14 operatively connected to the upper plate 11 and/or lower plate 12, wherein the upper plate 11 and lower plate 12 are substantially parallel to one another, and wherein the one or more retention devices 14 comprise one or more line retention members (not shown) for retaining one or more trimmer members 16, and wherein each line retention member is sized and configured to extend through a loop or aperture of at least one trimmer member 16 during operation of the weed trimmer apparatus. Additionally, a slide guard 18 is operatively connected at least to the lower plate 12 of the head 10.

The retention devices 14 shown in the embodiment illustrated in FIG. 1 are shown in more detail in FIG. 2. The retention devices 14 of FIGS. 1 and 2 are a 3-tier embodiment of a similar 1-tier embodiment of retention device depicted in FIG. 10. The 3-tier retention devices 14 of FIGS. 1 and 2 gives a user an option of setting a cut level desired by selecting which retention device 14 the trimmer member 16 is inserted. For example, by inserting trimmer line into a lowest tier, grass can be cut to a shorter length with a weed trimmer apparatus on which the retention devices 14 are mounted than by inserting line into a middle tier or a highest tier. Likewise, by inserting line into the middle tier, grass can be cut to a shorter length with a weed trimmer apparatus on which the retention devices 14 are mounted than by inserting line into the highest tier, and the grass can be cut to a longer length than by interesting line into the lower tier. In a preferred embodiment, trimmer head for use with a rotary powered weed trimmer apparatus comprises a housing having a central opening for operable connection to said weed trimming apparatus. Such embodiment further comprises a first series of three trimmer members 16 pivotally connected to said housing in a first plane. The exemplary horizontal plane of the first series can be seen in FIG. 1. Such preferred embodiment further comprises a second series of three trimmer members pivotally connected to the housing in a second plane that is generally parallel to and located above the first plane. The exemplary horizontal plane of the second series can also be seen in FIG. 1. In such embodiment, each of the trimmer members in the first series is capable of rotational movement within a lateral arc in the first plane of at least 180 degrees without striking the trimmer head or any of the second series of trimmer members, and each of the trimmer members in the second series is capable of rotational movement within a lateral arc in the second plane of at least 180 degrees without striking the trimmer head or any of the second series of trimmer members. Preferably, as can be appreciated from FIG. 1, the first series of trimmer members and second series of trimmer members are capable of use simultaneously to cut vegetation and also capable of use separately to cut vegetation. In yet another embodiment, the trimmer head further comprises a third series of three trimmer members pivotally connected to the housing in a third plane that is generally parallel to and located above said second plane, as further exemplified in FIG. 1.

As seen in FIGS. 1 and 2, in some embodiments, each retention device 14 comprises a case 90 and three line retention members 91. The upper portion of the line retention members 91 is composed of tooth-like grips (not shown) which assist in securing trimmer line around the line retention members 91 for retaining one or more trimmer lines 16. Line retention members 91 are operatively connected to the case. Through the case 90 is formed a chamber 92 with an aperture 93 from the chamber 92 on one side wall of the case 90, wherein the line retention members 91 for retaining at least one loop of one or more trimmer lines 16 extends through the aperture 93 of the chamber 92. Also, the chamber 92 in the case 90 defines at least one surface inside the case 90, the surfaces in this embodiment including a floor surface 94 and two side surfaces 95 on either side of the chamber 92. In the embodiment shown in FIG. 2, the line retention member 91 is in the shape of a hook, and the line retention member 91 is operatively connected to the floor surface 94 of the chamber 92. On either side of the aperture 93 are bumpers 98, which are rounded members which act to protect the trimmer line (not shown) from damage during use. There are also flanges 96 on outer surfaces of the case 90, which flanges 96 prevent the device from going through the opening in the plates 11 and 12 of the head 10, as shown in FIG. 1. Additionally, in the embodiment of the retention devices 14 shown in FIG. 2, a hollowed cavity 97 is made on the sides of the case 90 around the middle one of the three line retention members 91 in order to reduce weight, wherein the hollowed cavity 97 does not affect the operation of the weed trimmer apparatus on which the retention devices 14 can be mounted.

Similar to the retention devices 14 of FIGS. 1 and 2, the retention device of FIG. 10 has a similar structure, but with only one tier of retention device. In FIG. 10, the retention device 80 comprises a case 81 and a line retention member 82. The upper portion of the line retention member 82 is composed of tooth-like grips (not shown) which assist in securing trimmer line around the line retention members 82 for retaining one or more trimmer lines (not shown). Line retention members 82 are operatively connected to the case. Through the case 81 is formed a chamber 83 with an aperture 84 from the chamber 83 on one side wall of the case 81, wherein the line retention members 82 for retaining at least one loop of one or more trimmer lines extends through the aperture 84 of the chamber 83. Also, the chamber 83 in the case 81 defines at least one surface inside the case 81, the surfaces in this embodiment including a floor surface 85 and two side surfaces 86 on either side of the chamber 83. In the embodiment shown in FIG. 10, the line retention member 82 is in the shape of a hook, and the line retention member 82 is operatively connected to the floor surface 85 of the chamber 83. On either side of the aperture 84 are bumpers 89, which are rounded members which act to protect the trimmer line (not shown) from damage during use. There are also flanges 87 on outer surfaces of the case 81, which flanges 87 assist in securing the retention device 80 to the head of a weed trimmer apparatus (not shown).

FIG. 5 illustrates one embodiment of a trimmer head of a weed trimmer apparatus of the present invention, and FIG. 6 illustrates an exploded view of FIG. 5 of this embodiment. In FIGS. 5 and 6, the head 20 of a weed trimmer apparatus (not shown) is comprised of an upper plate 21 and a lower plate 22 which upper plate 21 and lower plate 22 are substantially parallel to one another, and wherein four similar retention devices 140 (three of which are shown) of this invention are operatively connected to the upper plate 21 and the lower plate 22 and are used for retaining at least one trimmer line 16 during operation of the weed trimmer apparatus. The retention devices 140 are operatively connected to the upper plate 21 at upper apertures 28 and to the lower plate 22 at lower apertures 42. Also, on a bottom side of the upper plate 21 are alignment buttons 26 which correspond to alignment receivers 27 which are on an upper side of the lower plate 22. Corresponding alignment buttons 26 and alignment receivers 27 align the upper plate 21 and lower plate 22 in the proper position for operation of the weed trimmer apparatus, which corresponding align the upper apertures 28 and lower apertures 42 for proper support of the retention devices 140. As seen in FIGS. 5 and 6, the upper plate 21 is comprised of an upper sleeve 23, through the center of which upper sleeve 23 is an upper passage 29. The upper sleeve 23 is supported by support members 25. Also, operatively connected to the lower plate 22 is a substantially circular protective guard 24. In a preferred embodiment, a circular protective glider guard plate 24 protects trimmer members 16 from breaking or excessive wear.

In FIG. 6, an exploded view of FIG. 5, it can also be seen that the lower plate 22 is comprised of a lower sleeve 40, reinforcement members 41, and lower apertures 42 for supporting the retention devices 140. Through the center of the lower sleeve 40 is a lower passage 43. Also, on the lower sleeve 40 are four openings for bolts 45. The upper sleeve 23 and lower sleeve 40 nest, as seen in FIG. 5, to bring the upper plate 21 and lower plate 22 closer together to support the retention devices 140. Then, nested with the upper sleeve 23 and lower sleeve 40 is a bearing 44 that is operatively connected to the protective glider guard plate 24 by the four bolts 45. Then, a bolt or other connector device (not shown) is used to connect the upper sleeve 23 and corresponding upper plate 21 to the lower sleeve 40 and corresponding lower plate 22 and to the bearing 44 and corresponding protective guard 24. Inside the bearing 44 is a spring 46 which assists when a connector device such as a bolt (not shown) is inserted through the upper passage 29, the lower passage 43, and an opening in the bearing 44, when the head 20 is assembled for use.

The four similar retention devices 140 of the embodiment depicted in FIGS. 5 and 6 (three of which are shown) are retention devices 140 which comprise one or more line retention members for retaining one or more trimmer lines 16. FIG. 11 illustrates the embodiment of a retention device 140 of this invention that is used in FIGS. 5 and 6. In a preferred embodiment, the retention device 140 in FIG. 11 comprises a case 142 and a trimmer member retention or engaging member 141, wherein the trimmer member retention or engaging member 141 is sized and configured to extend through a loop or aperture of at least one trimmer member (not shown in FIG. 11) during operation of the weed trimmer apparatus (not shown). The lower portion of the trimmer member retention member 141 is composed of tooth-like grips (not shown) which assist in securing trimmer line around the line retention member 141 for retaining one or more trimmer lines. Line retention or engaging member 141 is operatively connected to the case. Through the case 142 is formed a chamber 144 with an aperture 143 from the chamber 144 on one side wall of the case 142, wherein the trimmer member engaging member 141 for retaining at least one loop or aperture of one or more trimmer members 16 extends below the aperture 143 of the chamber 144. In one embodiment, on either side of the aperture 143 are bumpers 148, which are rounded members which act to protect trimmer line from damage during use. In the embodiment shown in FIG. 11, the trimmer member engaging member 141 is in a pendulum in an "L"-shape, which is operatively connected to the case 142 by a pivot support member 145 which extends from one side wall of the case 142 to an opposing side wall of the case 142 through holes 147 on either side of the case 142. The trimmer member engaging member 141 is operatively connected to the pivot support member 145 such that the trimmer member engaging member 141 rotates around the pivot support member 145, and wherein the trimmer member engaging member 141 is sized and configured to pivot to engage and to retain at least one loop or aperture of one or more trimmer members 16 such as trimmer lines or blades and then to pivot to remove the same. In one embodiment, there are also two flanges 146 on two outer surfaces of the case 142, which flanges 146 assist in securing the engaging device 140 to the head 30 of a weed trimmer apparatus. It should be appreciated that trimmer member engaging member 141 illustrated in FIG. 11 is substantially circular in form when viewed from a cross-sectional view yet may further be configured to be substantially square or shaped otherwise in form when viewed from a cross-sectional view as illustrated, for example, by the trimmer member engaging member 170 in FIG. 12.

FIG. 3 illustrates a trimmer head 30 of a weed trimmer apparatus consistent with one embodiment of the present invention comprising three embodiments of an engaging device of this invention. The head 30 comprises a central sleeve 31 through which a central passageway 32 allows the head 30 to be secured to the weed trimmer apparatus (not shown) for operation. The head 30 defines a side wall 33, the side wall forming three visible apertures 34 therethrough providing for passage of trimmer members 16 extending through said body 30 portion from a trimmer member entrance opening to a trimmer member install position. Corresponding to each aperture or passage 34, the head 30 also comprises three visible trimmer member engaging members (35, 170, and 60) operatively connected to the head 30, wherein each trimmer member engaging members (35, 170, and 60) is sized and configured to extend through a loop or aperture of at least one trimmer member, such as a trimmer blade or trimmer line (as shown in FIG. 1 and FIG. 3), during operation of the weed trimmer apparatus. As illustrated, two of the trimmer member engaging members (35 and 170) are dynamically connected to the head to allow for installation and removal of the loop or aperture of trimmer blade or trimmer line, while the third line retention member 60 is statically connected to the head 30 during installation and removal of the loop or aperture of trimmer blade or trimmer line and is sized and configured in the form of a hook that is substantially "L"-shaped. Each trimmer member engaging member may be dynamically connected to the head. As used throughout this disclosure and the appended claims, and "dynamically connected" in this context means that the trimmer member engaging member may rotate, slide, or otherwise move in relation to the head so that it is positionable into a trimmer member retention position or a trimmer member release position, all while remaining connected to the head 30. As used throughout this disclosure and the appended claims, "trimmer blade" 16 or "trimmer line" 16 may generally be used interchangeably, with exemplary embodiments illustrated in FIG. 1. As illustrated in FIG. 3, in one embodiment, through the sidewall 33 of the head 30 is also formed a pendulum aperture 39 through which an upper part of a pendulum 38 extends. Also, in one embodiment, around each aperture passage 34 in the head 30 are bumpers 37, which are rounded members which act to protect the trimmer member from damage during use.

Figure 18:
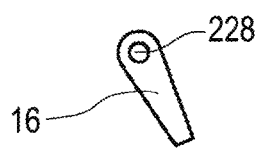
Figure 19:
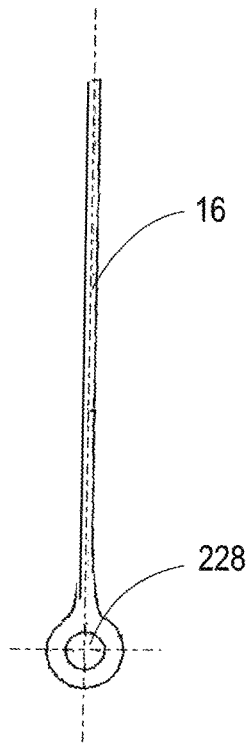

Regarding the three trimmer member engaging members (35, 170, and 60) of FIG. 3, the first dynamic trimmer member engaging member 35 is in the form of a pendulum 38 that is similar to those devices used in FIGS. 8 and 9, discussed in more detail infra. When upper part of the pendulum device 38 in FIG. 3 which extends through the pendulum aperture 39 is moved or pushed in a downward direction, the bottom portion of the pendulum 38 of the engaging member 35 which is visible through the aperture passage 34 is moved away from the sidewall 33 of the head 30 disposing said engaging member in a recess in the body 30 to clear said passage, which allows a mount loop 228 or mount aperture 228 of trimmer line 16 or trimmer blade 16 to be inserted into said passage 34 for engagement around the pendulum 38, as illustrated in FIGS. 1, 3, 17, 18, and 19. As illustrated in the Figures, to secure the mount loop 228 or mount aperture 228 of trimmer line 16 or trimmer blade 16 illustrated in FIGS. 17, 18, and 19 in place for operation of the weed trimmer apparatus, the upper part of the pendulum device 38 in FIG. 3 which extends through the pendulum aperture 39 is moved or pushed in a upward direction, and correspondingly, the bottom portion of the pendulum 38 of the engaging member 35 which is visible through the aperture passage 34 is moved downward or closer to the sidewall 33 of the head 30, which engages and secures the mount loop 228 or mount aperture 228 of trimmer line 16 or trimmer blade 16 around the pendulum 38 in a trimmer member install position, where the trimmer member engaging member 35 extends through said mount loop 228 or said mount aperture 228 as illustrated in FIGS. 1, 3, 17, 18, and 19. Line retention member 170 of FIG. 3 is also dynamic and is substantially "L"-shaped and is in the form of a moveable pin and is similar to the device used in FIG. 12, which is discussed in more detail infra. The upper portion of the line retention member 170 acts as a handle that may be lifted for insertion of a loop 228 of trimmer line around the bottom portion of the line retention member 170, and then the line retention member 170 may be pressed back down to secure the top of trimmer line 16 in place for the operation of the weed trimmer apparatus of this embodiment. Line retention member 60 of FIG. 3 is static and is in the form of a hook that is substantially "L"-shaped. A more detailed view and description of this line retention member 60 is provided infra with respect to FIG. 7. It should be appreciated that although the aperture defined by head 30 through which line retention member 170 is inserted is illustrated in FIG. 3 as substantially circular in form, the aperture may be substantially square or shaped otherwise in form and may be further sized and configured to accept line retention member 170 such that line retention member is kept from rotating once it has been inserted through the aperture.

Other embodiments of the retention devices of this invention include those illustrated in FIGS. 7, 8, 9, 12, 13, 14, 15, and 16.

In FIG. 7, the exemplary receptacle or retention device 60 comprises a case 61 and a line retention member 62. The upper portion of the line retention member 62 is composed of tooth-like grips (not shown) which assist in securing trimmer line around the line retention members 62 for retaining one or more trimmer lines (not shown). Preferably, line retention members 62 are operatively connected to the case. As illustrated in FIG. 7, through the case 61 is formed a chamber 63 with an aperture 64 from the chamber 63 on one side wall of the case 61, wherein the line retention members 62 for retaining at least one loop of one or more trimmer lines extends through the aperture 64 of the chamber 63. Also, the chamber 63 in the case 61 defines at least one surface inside the case 61, the surfaces in this embodiment including a floor surface 65 and two side surfaces 66 on either side of the chamber 63. In the embodiment shown in FIG. 7, the line retention member 62 is in the shape of a hook, and the line retention member 62 is operatively connected to the floor surface 65 of the chamber 63. On either side of the aperture 64 are bumpers 68, which are rounded members which act to protect the trimmer line from damage during use. There is also a flange 67 on the bottom of the outer surface of the case 61, which flange 67 assists in securing the retention device 60 to the head of a weed trimmer apparatus (not shown).

In FIG. 14, the retention device 70 is comprised of a substantially flat member 71 which forms an aperture 72 near one of its ends and three line retention members 73 which are operatively connected to the flat member 71 at an end of the flat member 71 proximal to the aperture 72, wherein the line retention members 73 are sized and configured to engage and to retain at least one loop of one or more trimmer lines (not shown). The retention device 70 further comprises a keeper member 74 which is operatively connected to the flat member 71 and which is sized and configured to surround at least a portion of the line retention members 73 to help retain at least one loop of one or more trimmer lines which are engaged with any or all of the line retention members 73. Also, in this embodiment, at an end of the flat member 71 distal to the aperture 72 are an opening 76 and a security wall 77. The opening 76 is sized and configured to receive a bolt 78 or similar connector device in order to use the retention device 70 in an oscillatory manor. The security wall 77 is used to alert a user when the opening 76 is beginning to wear down from use as to when the head of the bolt or similar connector device rubs against the security wall 77, alerting the user to replace the retention device 70 before further use of the weed trimmer apparatus (not shown). On either side of the aperture 72 are bumpers 75, which are rounded members which act to protect the trimmer line from damage during use.

In FIG. 8, the retention device 110 comprises a case 111 and a line retention member 112. Through the case 111 is formed a chamber 113 with an aperture 114 from the chamber 113 on one side wall of the case 111, wherein the line retention member 112 for retaining at least one loop of one or more trimmer lines (not shown) extends through the aperture 114 of the chamber 113. The lower portion of the line retention member 112 is composed of tooth-like grips (not shown) which assist in securing trimmer line around the line retention member 112 for retaining one or more trimmer lines. Line retention member 112 is operatively connected to the case. Also, the chamber 113 in the case 111 defines at least one surface inside the case 111, the surfaces in this embodiment including a floor surface 115 and two side surfaces 116 on either side of the chamber 113. In the embodiment shown in FIG. 8, the line retention member 112 comprises a latch 117 and a catch 118. The latch 117 is comprised of an arm operatively connected to form a pendulum, the fulcrum of which is a pivot member 119 which extends through the chamber 113. The latch 117 is operatively connected to the case on the top side of the aperture 114, and the catch 118 is operatively connected to the case 111 on the bottom side of the aperture 114, and wherein the latch 117 and the catch 118 are sized and configured to engage and to retain at least one loop of one or more trimmer lines. On either side of the aperture 114 are bumpers 109, which are rounded members which act to protect the trimmer line from damage during use. There is also a flange 108 on the bottom of the outer surface of the case 111, which flange 108 assists in securing the retention device 110 to the head of a weed trimmer apparatus (not shown). It should be appreciated that line retention member 112 illustrated in FIG. 8 as substantially circular in form when viewed from a cross-sectional view may further be configured to be substantially square or shaped otherwise in form when viewed from a cross-sectional view as illustrated, for example, by the line retention member 170 in FIG. 12.

In FIG. 15, the retention device 120 is comprised of a substantially flat member 121 which forms an aperture 122 near one of its ends and a line retention member 123 which is operatively connected to the flat member 121 at an end of the flat member 121 proximal to the aperture 122, wherein the line retention member 123 is sized and configured to engage and to retain at least one loop of one or more trimmer lines (not shown). The retention device 120 further comprises a pivot member 124 operatively connected to the flat member 121 at an end of the flat member 121 proximal to the aperture 122, wherein the line retention member 123 is rotatably connected to the pivot member 124, the retention device 120 further comprising at least two side walls 125, a top stopper 126, and a bottom stopper 226 wherein the two side walls 125 are operatively attached to the flat member 121 and are substantially perpendicular to the flat member 121, wherein the pivot member 124 extends between the side walls 125 and is rotatably connected to the side walls 125, wherein the line retention member 123 is operatively connected to the pivot member 124, and wherein the top stopper 126 and bottom stopper 226 extend between the side walls 125, are statically connected to the side walls 125, and the top stopper 126 is sized and configured to limit the rotation of the line retention member 123 about the pivot member 124. Also, in this embodiment, at an end of the flat member 121 distal to the aperture 122 are an opening 127 and a security wall 128. The opening 127 is sized and configured to receive a bolt or similar connector device (not shown) in order to use the retention device 120 in an oscillatory manor. The security wall 128 is used to alert a user when the opening 127 is beginning to wear down from use as the head of the bolt or similar connector device rubs against the security wall 128, thus alerting the user to replace the retention device 120 before further use of the weed trimmer apparatus. On either side of the aperture 122 are bumpers 129, which are rounded members which act to protect the trimmer line from damage during use. It should be appreciated that line retention member 123 illustrated in FIG. 15 as substantially circular in form when viewed from a cross-sectional view may further be configured to be substantially square or shaped otherwise in form when viewed from a cross-sectional view as illustrated, for example, by the line retention member 170 in FIG. 12. It should also be appreciated that the lower portion of the line retention member 123 may be composed of tooth-like grips (not shown) which assist in securing trimmer line around the line retention member 123 for retaining one or more trimmer lines. Line retention member 123 is operatively connected to the pivot member 124.

The retention device 130 in FIG. 9 comprises a case 132 and trimmer member engaging member 131, wherein the trimmer member engaging member 131 is sized and configured to extend through a loop or aperture of at least one trimmer line (not shown) during operation of the weed trimmer apparatus (not shown). The lower portion of the line retention member 131 is composed of tooth-like grips (not shown) which assist in securing trimmer line around the line retention member 131 for retaining one or more trimmer lines which line retention member 131 is operatively connected to the case. Through the case 132 is formed a chamber 134 with an aperture passage 133 from the chamber 134 on one side wall of the case 132, wherein the trimmer member engaging member 131 for retaining at least one loop or aperture of one or more trimmer lines or blades extends below the aperture passage 133 of the chamber 134. On either side of the aperture 133 are bumpers 138, which are rounded members which act to protect the trimmer line or blade from damage during use. In the embodiment shown in FIG. 9, the line retention member 131 is in a pendulum in an "L"-shape, which is operatively connected to the case 132 by a pivot support member 135 which extends from one side wall of the case 132 to an opposing side wall of the case 132 through holes 137 on either side of the case 132. The line retention member 131 is operatively connected to the pivot support member 135 such that the line retention member 131 rotates around the pivot support member 135, and wherein the trimmer member engaging member 131 is sized and configured to pivot to engage and to retain at least one loop or aperture of one or more trimmer lines or blades and then to pivot to remove the same. There is also a flange 136 on the bottom outer surface of the case 132, which flanges 136 assist in securing the retention device 130 to the head (e.g., head 10, head 20, head 30 of FIGS. 1, 5, 3, respectively) of a weed trimmer apparatus. It should be appreciated that line retention member 131 illustrated in FIG. 9 as substantially circular in form when viewed from a cross-sectional view may further be configured to be substantially square or shaped otherwise in form when viewed from a cross-sectional view as illustrated, for example, by the line retention member 170 in FIG. 12.

In FIG. 13, the retention device 190 is comprised of a substantially flat member 191 with one end proximal to a trimmer head (not shown) when attached, which forms an opening 196 which is sized and configured to receive a bolt or similar connector device (not shown) in order to use the retention device 190 in an oscillatory manor with the head. At an end distal to the opening 196, the retention device 190 comprises a keeper member 198 is comprised of a lower portion that is substantially perpendicular to the flat member 191 and an upper portion that is substantially parallel to the flat member 191. Attached to the keeper member 198 is a line retention member in the form of a pendulum 193 and through which keeper member 198 a pendulum pin 199 traverses, which pendulum pin 199 is operatively connected to a line retention member in the form of the pendulum 193 and which pendulum pin 199 acts as a fulcrum for the pendulum 193. Also, the keeper member 198 comprises a catch 194, wherein the catch 194 secures the pendulum 193 to the keeper member 198 when engaged. The pendulum 193 is sized and configured to open to engage the trimmer line and to allow the trimmer line to pass between the pendulum 193 and the keeper member 198 and then to close with the catch 194 to retain the trimmer line in place near the keeper member 198. Also, through the keeper member 198 is formed two apertures 192 through which at least one loop of one or more trimmer lines (not shown) may be threaded. In this embodiment, trimmer line may be threaded into one aperture 192, around the keeper member 198, between the keeper member 198 and the pendulum 193 when open, and out the other aperture 192, and then the pendulum 193 is closed in order to retain the trimmer line during operation. Also, in this embodiment, at an end of the flat member 191 proximal to the opening 196 is a security wall 197. The security wall 197 is used to alert a user when the opening 196 is beginning to wear down from use as to when the head of the bolt or similar connector device rubs against the security wall 197, alerting the user to replace the retention device 190 before further use of the weed trimmer apparatus. Around the apertures 192 are bumpers 195, which are rounded members which act to protect the trimmer line from damage during use.

In FIG. 16, the retention device 150 is comprised of a substantially flat member 151, two side walls 152, a line retention member 153, and a support plate 154 operatively connected to the line retention member, which is in the form of a hook 153 in this embodiment. The two side walls 152 are operatively attached to the flat member 151 and are substantially perpendicular to the flat member 151 so as to form a slot 156 between the two side walls 152. The retention device 150 further comprises a tract 155 which is operatively connected to the flat member 151 and which is sized and configured to allow the support plate 154 to slide towards and away from the slot 156, wherein the line retention member 153 is axial to the slot 156. On either side of the slot 156 are bumpers 157, which are rounded members which act to protect the trimmer line (not shown) from damage during use.

In FIG. 12, the retention device 171 is comprised of a case 172 and line retention member 170. Line retention member 170 is dynamic and is substantially "L"-shaped and is in the form of a moveable pin. The upper portion of the line retention member 170 acts as a handle that may be lifted for insertion of a mount aperture end 228 of a trimmer blade 16 or a loop end 228 of a trimmer line (not shown) around the bottom portion of the retention member 170, and then the retention member 170 may be pressed back down to secure the top of trimmer member in place for operation of the weed trimmer apparatus of this embodiment (not shown). Through the case 172 is formed a chamber 173 with an aperture 174 from the chamber 173 on one side wall of the case 172, wherein the bottom portion of the line retention member 170 for retaining at least one loop 228 of one or more trimmer lines extends through the aperture 174 of the chamber 173 from a second aperture 180 formed from the top cover 175 of the case 172. Also, the chamber 173 in the case 172 defines at least one surface inside the case 172, the surfaces in this embodiment including a floor surface 176 and two side surfaces 177 on either side of the chamber 173. On either side of the aperture 174 are bumpers 178, which are rounded members which act to protect the trimmer line from damage during use. There is also a flange 179 on the bottom of the outer surface of the case 172, which flange 179 assists in securing the retention device 171 to the head of a weed trimmer apparatus. It should be appreciated that although the second aperture 180 defined by top cover 175 through which line retention member 170 is inserted is illustrated in FIG. 12 as circular in form, the aperture may be substantially square or shaped otherwise in form and may be further sized and configured to accept line retention member 170 such that line retention member is kept from rotating once it has been inserted through the second aperture 180.

In FIG. 4 is depicted one embodiment of a protective guard assembly 50 which is configured to operatively connect to a head of a weed trimmer apparatus (not shown) during operation. The protective guard 50 is substantially circular in shape. In the center of the protective guard 50 is a substantially hollow sleeve 51 for fitting to the head (not shown). There are also reinforcement members 52 that support the sleeve as well as connector devices 53 which allow connection to the head.

As discussed supra, one embodiment of the present invention is a weed trimmer apparatus comprising a head defining at least one side wall. The weed trimmer apparatus of this invention may be a hand-held, powered tool or a wheeled-type, powered device behind which the user walks to use the device. If the weed trimmer apparatus is a hand-held, powered tool, the weed trimmer apparatus may have a long handle or a more compact, hand-gun-like design or the like. Also, the head (e.g., head 10, head 20, head 30 of FIGS. 1, 5, 3, respectively) of the present invention may be any suitable shape and size for a weed trimmer apparatus. Preferably the head has a rounded sidewall in order to cause less stress on the trimmer line when the weed trimmer apparatus is in use.

The line retention members for retaining one or more trimmer lines, which line retention members are operatively connected to the head, may be of any size and shape so long as each line retention member is sized and configured to extend through a loop or aperture of at least one trimmer line during operation of the weed trimmer apparatus and to allow for easy removal of the trimmer line. The line retention members of this invention may be dynamic or static. Also, the line retention member can be comprised of any suitable material for retaining the trimmer line. Preferably, the line retention member is comprised of a rigid metal or hard plastic material.

Suitable examples of static line retention members include objects in the form of a hook, a curved or angled member, a body comprising two or more interconnected members, and like objects which are substantially static. A hook of this invention may comprise one or more hooks, and each hook may be bent back at an angle or with a round bend or the like. Preferably, the hook is bent back at a substantially 90 degree angle and in either an "L"- or a "T"-shape and the like, and preferably, the hook is comprised of a rigid metal or hard plastic material.

Suitable examples of dynamic line retention members include those which rotate, slide, or otherwise move, and the like, including line retention members in the form of a pendulum, a sliding hook, a moveable pin, and the like, so long as the line retention member is dynamic in relation to the head of the weed trimmer apparatus. A pendulum of this invention is any object or collection of objects which rotates or swings around a fulcrum or similar pivot point. Preferably, the pendulum of this invention is comprised of a rigid metal or hard plastic pin and arm, wherein the pin retains the loop of trimmer line, while the arm acts as a handle to maneuver or rotate the pin during insertion or removal of trimmer line in a retention device of this invention. A sliding hook of this invention may comprise one or more hooks, and each hook may be bent back at an angle or with a round bend or the like and which hook may be dynamic itself or be static itself but attached to a dynamic device, such as a support plate which is dynamic in relation to the head of the weed trimmer apparatus. Preferably, the sliding hook is bent back at a substantially 90 degree angle and in either an "L"- or a "T"-shape and the like and is comprised of a rigid metal or hard plastic material. A moveable pin of this invention may be straight or may be "L"- or "T"-shaped wherein an upper or bent portion of the "L" or "T" acts as a handle for ease of inserting and removing trimmer line, and the moveable pin is preferably comprised of a rigid metal or hard plastic material as well.

The trimmer member 16 which is used which this invention may be any suitable, flexible cutting member of any length and of any material. Not all of the trimmer members 16 have to be of equal width or length for the operation of the weed trimmer apparatus of the present invention; however, preferably, each trimmer line used is a substantially uniform segment of line with each trimmer line having a similar width and length to other trimmer line used simultaneously. The trimmer line used may be a closed loop or an open loop. In the closed loop configuration of one embodiment, one end of a segment of the trimmer line is blunt while the other end is sized and configured in a loop 228 as a mount aperture 228 as illustrated in FIGS. 1, 3, 17, 18, and 19. In the open loop configuration of an embodiment, a segment of the trimmer line is bent in the shape of a "U" to form a mount aperture 228, with two blunt ends of trimmer line, as illustrated in FIG. 3. Preferably, the trimmer line used is in an open loop configuration wherein the open loop of trimmer line is engaged and retained by a line retention member at about halfway down the length of loop, and preferably, the trimmer line is comprised of a nylon material.

Also, as discussed supra, another embodiment of the present invention is a weed trimmer apparatus comprising a head comprising two or more plates, and one or more retention devices operatively connected to one or more of the plates, wherein the one or more plates are substantially parallel to one another. The plates of this embodiment may be of any suitable shape and size in order to retain and support the line retention members of this embodiment; however, substantially circular plates that are substantially similar in size to one another are preferred for a given head of a weed trimmer apparatus. Also, preferably, each plate will have at least two holes in which each of the holes is aligned with a respective hole in the other plate(s) of the head, and wherein each of the holes is sized and configured to receive at least a portion of one retention device and support the retention device. Most preferably, each plate has four holes, wherein the holes of each plate are aligned with the holes of the other plates. The plates may be comprised of any durable and rigid material that is sufficiently strong to support the retention devices of this invention. Preferably, the plates of this invention are comprised of a rigid metal or hard plastic material.

Also, any number of plates may be used in the head of this embodiment. Preferably, two plates are used, wherein a retention device used is supported in each set of corresponding holes of the two plates. When two plates are used, there may be retention devices situated between the plates and/or above or below the plates. In some embodiments, there is a 3-tier retention device operatively connected with the two plates, wherein at least one of the line retention members of each retention device is located above an upper one of the two plates, at least one of the line retention members of each retention device is located between the two plates, and at least one of the line retention members of each retention device is located below a lower one of the two plates.

The retention devices of certain embodiments of the present invention may be any device comprising a line retention member which can retain at least one loop of one or more trimmer lines. In some embodiments, the retention device comprises a case to which the line retention member is operatively connected. The case can be comprised of any rigid material, but is preferably comprised of a hard plastic. Also, the case may be of any suitable shape and size, and preferably, the case has a rounded side wall to reduce stress on the trimmer line during operation of the weed trimmer apparatus. The retention devices may operate in a fixed manner when the head is rotated at a relatively high rate of speed or may operate in an oscillatory manner.

In other embodiments of the present invention, a retention device comprises a substantially flat member and at least one line retention member which is operatively connected to the flat member, wherein the line retention member is sized and configured to engage and to retain at least one loop of one or more trimmer lines. Preferably, the flat member forms an opening on an end distal from the line retention member, wherein the opening is sized and configured to receive a bolt or similar connector device in order to use the retention device in an oscillatory manor. The flat member may be comprised of any suitable material for use on a head of a weed trimmer apparatus. Preferably, the flat member is comprised of rigid metal or hard plastic.

The protective glider assembly of certain embodiments of the present invention, which is operatively connected to the trimmer head in some embodiments of this invention, can be any shape and size. In one embodiment, the protective guard 24 can be larger than the width or radius of the bottom of the head, or smaller than the width or radius of the bottom of the head. Preferably, the protective guard 24 is circular in shape, as illustrated in FIG. 5. When connected to the trimmer head (e.g., head 10, head 20, head 30 of FIGS. 1, 5, 3, respectively), the protective guard 24 can be used as a slider in order to slide the weed trimmer apparatus along the ground and maintain a uniform cutting height. Also, particularly when the protective guard glider 24 is larger than the bottom of the head, the protective guard works to protect portions of the trimmer line or blade from excessive wear by protecting said trimmer member. The protective guard 24 may be comprised of any rigid material. Preferably, the protective guard 24 is comprised of rigid metal or hard plastic.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

Each and every patent or other publication or published document referred to in any portion of this specification is incorporated in toto into this disclosure by reference, as if fully set forth herein.

This invention is susceptible to considerable variation within the spirit and scope of the appended claims.

What is claimed is:

1. A trimmer head for a rotary cutting apparatus comprising:
    a body portion;
    a trimmer member passage extending through said body portion from a trimmer member entrance opening to a trimmer member install position;
    a first series of two or more trimmer members pivotally connected to said body portion in a first plane;
    a second series of two or more trimmer members pivotally connected to said body portion in a second plane that is generally parallel to and located above said first plane;
    a trimmer member fastening mechanism having a trimmer member engaging member pivotally movable between a first position and a second position, said trimmer member engaging member biased by a biasing mechanism into the second position such that the trimmer member engaging member extends across said trimmer member passage at said trimmer member install position, said engaging member being movable against such bias to clear said passage;
    a trimmer member forming a mount aperture proximate an insertion end thereof, wherein said trimmer member is secured to said body portion when said mount aperture occupies said trimmer member install position and said trimmer member engaging member extends through said mount aperture; and
    wherein said trimmer member is secured to said body portion by inserting said insertion end of said trimmer member into said trimmer member entrance opening and advancing said mount aperture through said trimmer member passage toward said trimmer member install position such that said insertion end contacts said engaging member and moves said engaging member to said first position to clear said trimmer member passage, said trimmer member engaging member having a longitudinal axis, and when in said first position, said trimmer member engaging member is disposed in a recess in said body portion and said longitudinal axis is oriented substantially parallel to a longitudinal axis of said trimmer member.

2. The trimmer head of claim 1, wherein said mount aperture is advanced through said trimmer member passage toward said trimmer member install position until said mount aperture reaches said trimmer member engaging member and said trimmer member engaging member moves into said mount aperture under the influence of said biasing mechanism to occupy said trimmer member install position.

3. The trimmer head of claim 1 wherein the trimmer member is shaped as a flat blade member or a thin and round line member.

4. The protective glider assembly of claim 1 further comprising a protective glider operatively connected to the trimmer head,
    and
    a bearing structured and cooperable with the protective glider such that the protective glider is configured to rotate or remain stationary independent of and relative to any rotation of the trimmer head.

5. A trimmer head for use with a rotary powered weed trimmer apparatus, said trimmer head comprising:
    a housing having a central opening for operable connection to said weed trimming apparatus;
    a first series of three trimmer members pivotally connected to said housing in a first plane; a second series of three trimmer members pivotally connected to said housing in a second plane that is generally parallel to and located above said first plane;
    wherein each of the trimmer members in said first series is capable of rotational movement within a lateral arc in said first plane of at least 180 degrees without striking said trimmer head or any of the second series of trimmer members and where each of the trimmer members in said second series is capable of rotational movement within a lateral arc in said second plane of at least 180 degrees without striking said trimmer head or any of the second series of trimmer members;

said first series of trimmer members and second series of trimmer members capable of use simultaneously to cut vegetation and also capable of use separately to cut vegetation.

6. The trimmer head of claim 5, further comprising a third series of three trimmer members pivotally connected to said housing in a third plane that is generally parallel to and located above said second plane.

7. The trimmer head of claim 5, further comprising a retention mechanism for pivotally connecting each of the trimmer members to said housing.

8. The trimmer head of claim 5, further comprising
a trimmer member passage extending through said housing from a trimmer member entrance opening to a trimmer member install position and
a trimmer member fastening mechanism having a trimmer member engaging member pivotally movable between a first position and a second position.

9. The trimmer head of claim 5, wherein the trimmer members are either in the shape of a flat blade or a thin round line.

\* \* \* \* \*